June 7, 1938.  A. THOMPSON  2,119,834
DRAFT APPLIANCE
Filed Jan. 21, 1937

Albert Thompson
INVENTOR
BY Victor J. Evans & Co.
ATTORNEYS

Patented June 7, 1938

2,119,834

UNITED STATES PATENT OFFICE 2,119,834

DRAFT APPLIANCE

Albert Thompson, Collinston, La.

Application January 21, 1937, Serial No. 121,671

2 Claims. (Cl. 278—97)

This invention relates to draft appliances and has for the primary object the provision of an efficient and inexpensive device of this character which may be readily adapted in a draft animal hitch to permit an animal to pull or start loads with more ease and with more comfort and with the liability of injury reduced to a minimum and which may be manufactured and sold at a low cost.

With these and other objects in view, this invention consists in certain noval features of construction, combination and arrangement of parts to be hereinafter more fully described and claimed.

For a complete understanding of my invention, reference is to be had to the following description and accompanying drawing, in which Figure 1 is a plan view illustrating the draft appliance connected to a double tree and single tree of an animal draft hitch.

Figure 1:
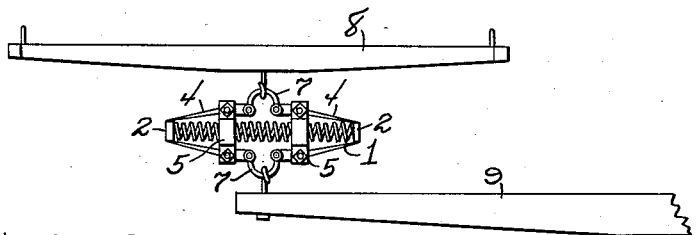
Figure 2:
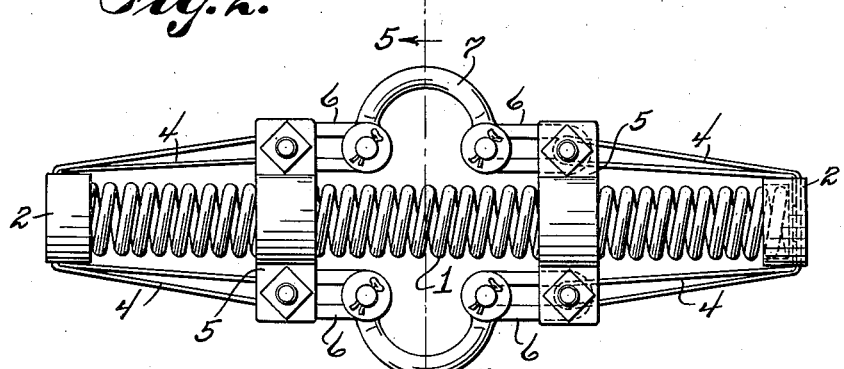
Figure 2 is a top plan view drawn on an enlarged scale illustrating the draft appliance.
Figure 3:
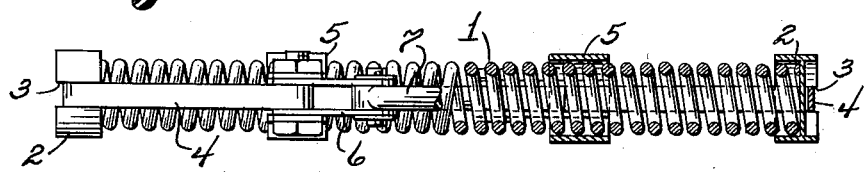
Figure 3 is an edge elevation, partly in section, illustrating the device.
Figure 4:
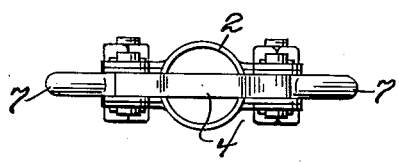
Figure 4 is an end view illustrating the device.
Figure 5:
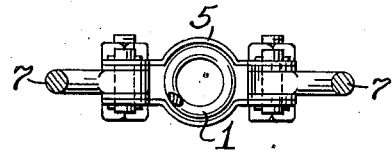
Figure 5 is a transverse sectional view taken on the line 5—5 of Figure 2.

Referring in detail to the drawing, the numeral 1 indicates a coil spring having its ends seated in cup-shaped elements 2. Said elements 2 are provided with notches 3 to receive straps 4. Separable clips 5 surround the spring 1 and have the straps 4 connected thereto. Connected to the clips 5 are slotted links 6 to which are pivotally connected substantially U-shaped attaching elements 7, one of which is connected to a single tree 8 and the other to a double tree 9. Thus it will be seen that the single tree 8 is connected to the double tree 9 in such a way that a limited yielding movement will be provided between the single and double trees to absorb shocks and jars to the animal hitched to the single tree and caused by the animal starting to pull the load and also caused by any sudden increase of load on the animal by the conveyance or similar device engaging an obstruction. The elements 7 when initially subjected to draft force compress the spring thus allowing the draft animal to take up the load with ease and to permit the draft animal to move heavier loads without injury.

Having described the invention, I claim:

1. A draft appliance comprising a coil spring, cup-shaped elements receiving the ends of the spring, straps engaging the cup-shaped elements, separable clips having the straps connected thereto and the spring extending therethrough, links connected to said clips, and means connecting said links to a draft hitch.

2. A draft appliance comprising a coil spring, cup-shaped elements receiving the ends of the spring, straps engaging the cup-shaped elements, separable clips having the straps connected thereto and the spring extending therethrough, links connected to said clips, and substantially U-shaped elements connected to said links and to a single tree and a double tree of a draft hitch.

ALBERT THOMPSON.